Patented Feb. 10, 1931

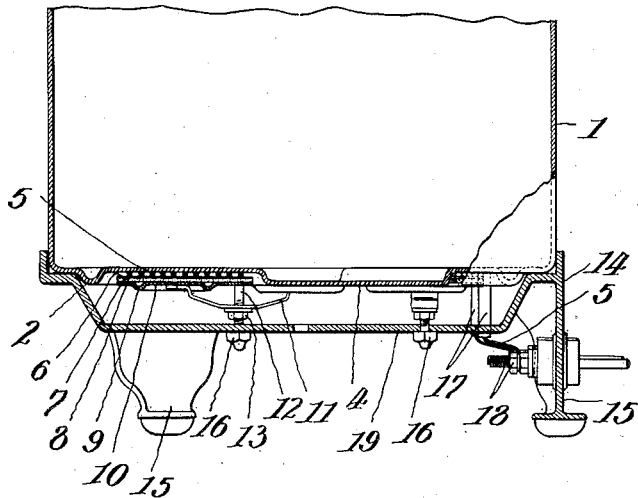

1,792,390

UNITED STATES PATENT OFFICE

TETSUO OKAMOTO, OF OSAKA-SHI, JAPAN

ELECTRIC HEATING APPARATUS

Application filed October 12, 1928. Serial No. 312,126.

This invention relates to improvements in electric heating apparatus, and more particularly concerns an electric heating apparatus directly attached to the bottom of an enamelled iron kettle for boiling water and food etc.

The object of the invention is to provide an electric heating apparatus in which the transmission of heat is efficiently effected and electric energy is economically employed.

A feature of the invention is that the heating wire is arranged directly at outside of the bottom of an enamelled iron kettle and in direct contact with it, so that the transmission of heat is efficient and the temperature of said heating wire may be kept relatively low due to the direct contact with the bottom of an enamelled iron kettle containing water and food etc. of relative low temperature therein.

Another feature of the invention is that the apparatus is durable, as wear of the heating wire may be considerably reduced due to the relative low temperature.

A further feature of the invention is that the apparatus is economical to manufacture and to use, as the heating wire may be of small size due to the less wear thereof and electric energy may be efficiently utilized.

The invention will be described by way of example with reference to the accompanying drawings, in which:

Fig. 3 is a sectional view on line 111—111 in Fig. 2 of lower part of the kettle with the apparatus according to the invention attached thereto.

Figure 1:
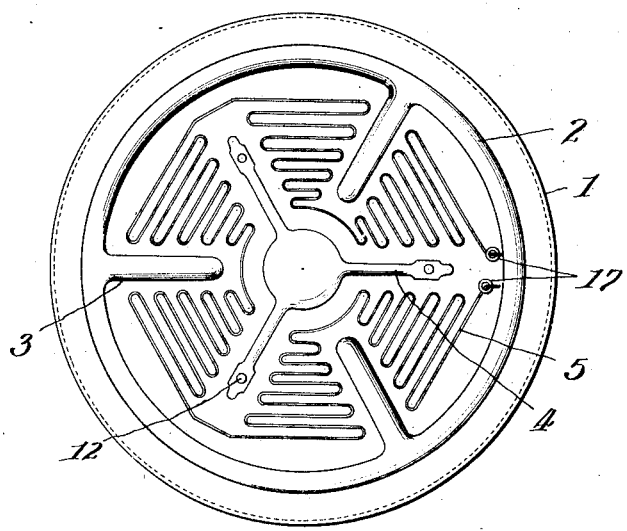
Fig. 1 is a bottom view of an enamelled small kettle with the heating wire arranged on the bottom thereof.
Figure 2:
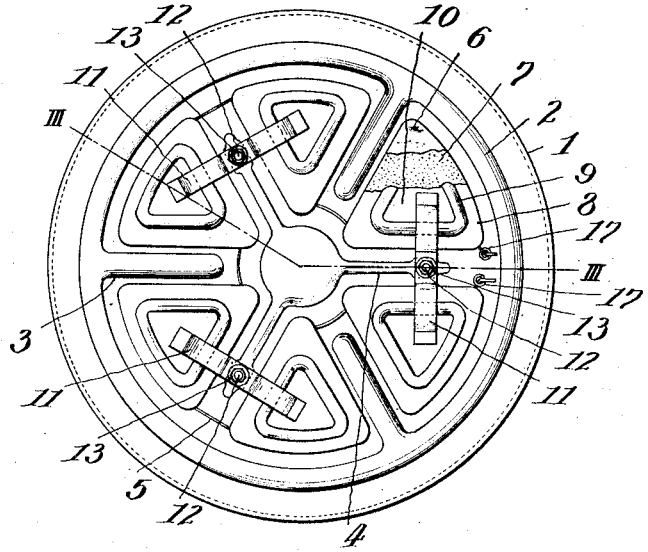
Fig. 2 is similar view with the heating wire overlapped by thin layers of mica, asbestos plates and holding plates and securely held in position by means of dogs.

Referring to the drawings, the small kettle 1 is formed at its bottom with a rib 2 adjacent to and along the contour of its bottom end, several radial ribs 3 extended from the rib 2 near the center of the bottom and other radial ribs 4 extended from the center near the rib 2 between the ribs 3, so that several divisional spaces are formed on the bottom, as shown in Figs. 1 and 2.

An electrical heating wire 5 of any suitable material is arranged in flat wave form in direct contact with outside of the bottom of the kettle 1 in the divisional spaces as shown in Fig. 1, and each portion of the heating wire in the divisional spaces is overlapped by a thin layer of mica, asbestos plate and ribbed plates 8 with a central space 9 formed by a rib 9 for receiving a leg of a dog 11, and is securely held in position by means of the dog 11, and a stud bolt 12 fixed on the bottom and a nut 13 as shown in Figs. 2 and 3.

The small kettle is mounted on a stand 14 formed with legs 15 and a hood 19 for sheathing the heating apparatus and is secured thereto by means of the studs 12 and nuts 16 as shown in Fig. 3. The ends of the heating wire 5 are led through the insulating tubes 17 and connected to the terminals 18 attached to the stand 14.

Though a single example of the invention has been shown it will be readily seen that various modifications and substitutions can be made without departing from the scope and spirit thereof.

Having now particularly described and ascertained the nature of my said invention and in what manner the same is to be performed I declare that what I claim is:—

An article of the class described comprising an enamelled vessel, a circular rib formed in the bottom thereof, and disposed adjacent its periphery, a plurality of radially disposed ribs formed in said bottom and merging with the circular rib, the latter ribs extending toward the center of the bottom and having their inner ends spaced from each other, a plurality of ribs formed in said bottom and extending from the center thereof toward the circular rib and serving in conjunction with the radial ribs to divide the bottom into a plurality of recesses, heating elements consisting of wires of wave form arranged in each recess and in intimate contact with said bottom, a sheet of insulating material engaged with each heating element, a plate engaged with each sheet, dogs having their ends engaged with the plates, and bolts carried by the second named ribs adapted to engage the dogs to hold the ends thereof engaged with said plates.

In testimony whereof I affix my signature.

TETSUO OKAMOTO.